Aug. 7, 1956  A. E. AUKENS  2,757,810
HOLDER EMPTYING DEVICE
Filed Oct. 9, 1952  9 Sheets-Sheet 1

INVENTOR.
ADRIAN E. AUKENS
BY
Geo. B. Pitts
ATTORNEY

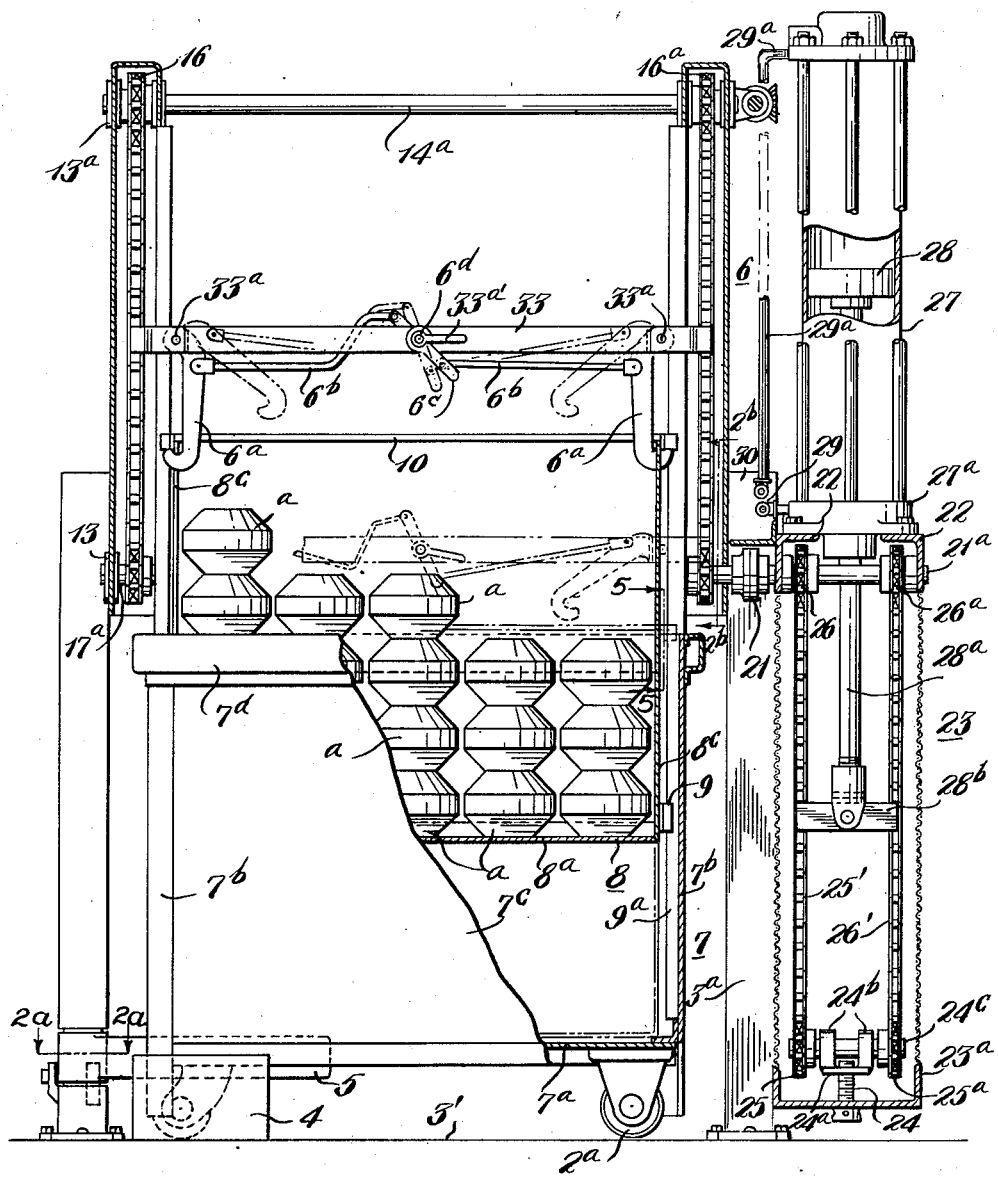
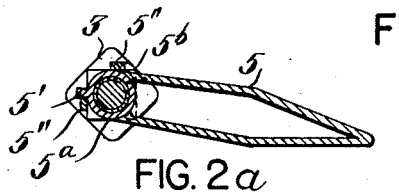
FIG. 2
FIG. 2a

Aug. 7, 1956
A. E. AUKENS
2,757,810
HOLDER EMPTYING DEVICE
Filed Oct. 9, 1952
9 Sheets-Sheet 3
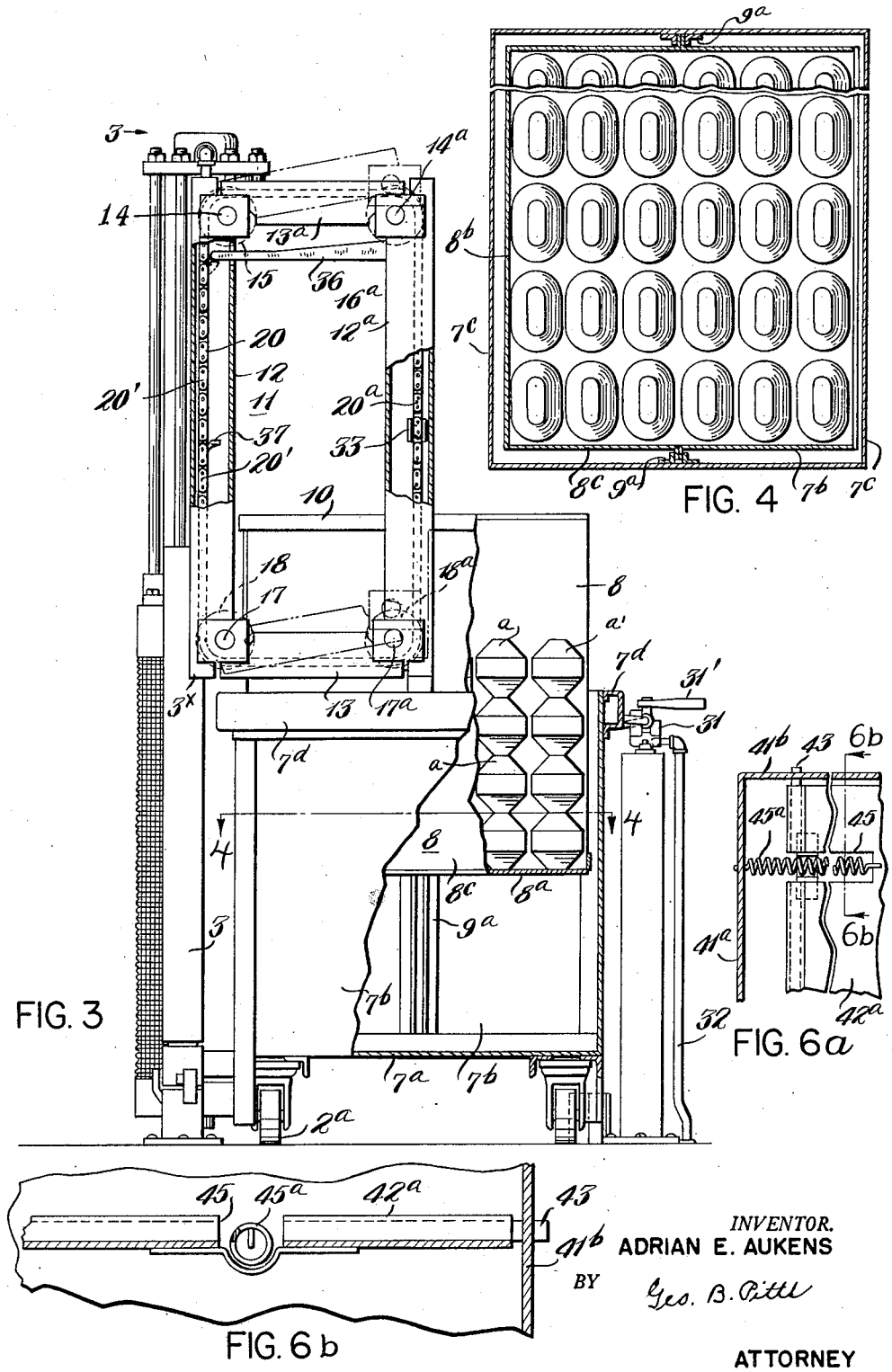
INVENTOR.
ADRIAN E. AUKENS
BY
Geo. B. Pitt
ATTORNEY

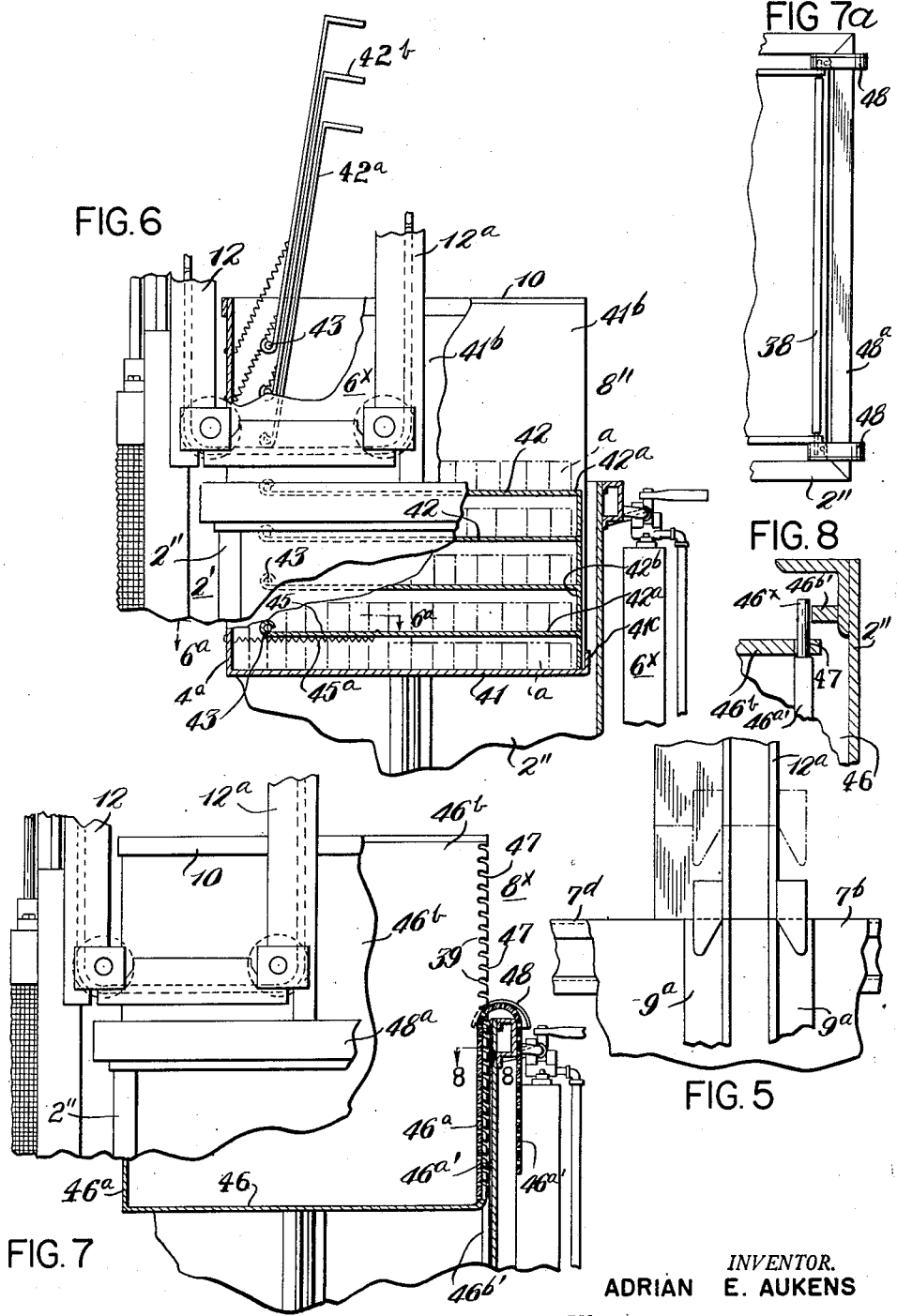

Aug. 7, 1956　　　　A. E. AUKENS　　　　2,757,810
HOLDER EMPTYING DEVICE
Filed Oct. 9, 1952　　　　　　　　　　　　9 Sheets-Sheet 6

INVENTOR.
ADRIAN E. AUKENS
BY Geo. B. Pitts
ATTORNEY

Aug. 7, 1956          A. E. AUKENS          2,757,810

HOLDER EMPTYING DEVICE

Filed Oct. 9, 1952          9 Sheets-Sheet 7

INVENTOR.
ADRIAN E. AUKENS
BY Geo. B. Pitts
ATTORNEY

Aug. 7, 1956  A. E. AUKENS  2,757,810
HOLDER EMPTYING DEVICE
Filed Oct. 9, 1952  9 Sheets-Sheet 8

INVENTOR.
ADRIAN E. AUKENS
BY
Geo. B. Pitts
ATTORNEY

Aug. 7, 1956  A. E. AUKENS  2,757,810
HOLDER EMPTYING DEVICE

Filed Oct. 9, 1952  9 Sheets-Sheet 9

INVENTOR.
ADRIAN E. AUKENS
BY
Geo. B. Pitts
ATTORNEY

United States Patent Office 2,757,810
Patented Aug. 7, 1956

2,757,810

HOLDER EMPTYING DEVICE

Adrian E. Aukens, Bay Village, Ohio

Application October 9, 1952, Serial No. 313,961

6 Claims. (Cl. 214—315)

This invention relates to a process of handling bodies or articles to be processed, wherein groups thereof are successively conveyed to an operating station and individually processed, treated or tested and then the groups of processed, treated or tested bodies are successively conveyed to a second operating station for treatment or a place of delivery.

The bodies or articles may be formed of suitable material, such as metal, metallic alloy and/or plastic substance, of any predetermined shape, due to casting of the material in molds, stamping or machining operations. The processing step herein referred to may be the only step required to finish each body or it may be one of several steps depending on the type of body and/or other factors. It will therefore be apparent that the bodies herein shown are merely for the purpose of exemplification and not intended to limit the invention to any specific shape thereof.

As later set forth, the process consists in conveying groups of the bodies to an operating station having a mechanism or apparatus adapted to process, treat or test the bodies and an attendant or operator associated therewith who manually selects each body and subjects it to the mechanism or apparatus. The processing mechanism or apparatus may consist of a bath or sprayer, whereas the fabricating machine may consist of a polishing device, drill, shaper, cutter, blower and the like. More specifically, in carrying out the process the first step consists in filling a portable holder with groups of bodies for individual accessibility, delivering the holder to an operating station, manually subjecting each body to a treatment, then delivering each body to a receiver. As later set forth, the delivery step may consist in filling a separate portable holder with the treated bodies to facilitate final disposition of the latter.

The invention includes a holder in which provision is preferably made to assemble the articles in superimposed layers or groups and a power operated mechanism removably engaging the holder, for raising the latter. The invention also includes a holder having movable supports for the layers or groups of articles and means for automatically displacing each upper support when the holder is raised to adjust each adjacent lower support into an accessible position.

The invention also includes a positioning mechanism at the operating station for each holder to predeterminately relate the latter to the operator and means for successively positioning the groups of bodies at a level related to the operator's arm length or "reach." Such operation of the groups of bodies shortens the physical movements on the part of the operator, whereby undue fatigue is eliminated. By moving each group of bodies to a predetermined level, relative to the operator or his arm "reach," it will be observed that a person whose sight is impaired may be employed as the operator.

The invention also includes an operating station having two positioning mechanisms for holders drivingly connected for simultaneous movement in opposite directions.

As later set forth, the bodies to be treated are arranged in groups in superimposed relation in a holder which is then delivered to and secured in one of the positioning mechanisms for movement upwardly to locate each group at the predetermined level and an empty holder is secured in the other positioning mechanism for movement downwardly a distance corresponding to each upward movement of a group of bodies. In this arrangement each body is removed from the filled holder, subjected to one or more treatments and then placed in the other holder. Accordingly, when the initially filled holder becomes empty the other holder is filled with treated bodies ready for replacement by an empty holder.

In carrying out the process, as the articles at the source of supply are delivered to holders or conveying receptacles, each holder or receptacle may be filled with a predetermined number of bodies or articles, so that by noting the number of holders conveyed to the operating station per hour or working period, suitable accounting records may be kept.

One object of the invention is to economically supply a plurality of bodies or articles and subject them to at least one step in the manufacture thereof.

Another object of the invention is to provide an improved mechanism disposed in a predetermined relation to the operator of a machine, adapted to successively removably receive and raise holders filled with a plurality of articles, whereby the latter are progressively positioned for accessibility and rapid removal.

Another object of the invention is to provide an improved raisable holder having a plurality of movably mounted superimposed supports for articles and provided with means for automatically successively displacing the supports on which the articles are positioned or assembled, to dispose each lower support at a level, whereby removal of each article on each support is facilitated.

Another object of the invention is to provide an improved process or system of handling articles to be treated wherein a plurality of articles are collected at a supply source and initially delivered to a fabricating or process station and then groups or sets thereof are moved into an accessible position for transfer to the fabricating or processing apparatus.

In the following description of words "article" or "articles" are intended to comprehend various kinds of bodies, work pieces and products and the words "treating" or "treatment" are intended to comprehend spraying, chemical, electrical and mechanical operations on the articles.

Other objects of the invention will be apparent to those skilled in the art to which my invention relates from the following description taken in connection with the accompanying drawings, wherein:

Fig. 2a is a fragmentary section on the line 2a—2a of Fig. 2;

Fig. 3 is a section on the line 3—3 of Fig. 1, parts being broken away;

Fig. 4 is a section on the line 4—4 of Fig. 3;

Fig. 5 is a fragmentary section on the line 5—5 of Fig. 2, enlarged;

Fig. 6 is a view of a holder embodying a modified form of construction, parts being broken away;

Fig. 6a is a fragmentary section on the line 6a—6a of Fig. 6;

Fig. 6b is a section on the line 6b—6b of Fig. 6a;

Fig. 7 is a view of a holder embodying another modified form of construction, parts being broken away;

Fig. 7a is a fragmentary plan view of parts shown in Fig. 7;

Fig. 8 is a section on the line 8—8 of Fig. 7;

Fig. 9 is an elevational view of the holder positioning mechanism showing a modified form of construction, a holder being shown in a raised position and illustrating the operator removing an article a;

Figures 1, 2, 2B:
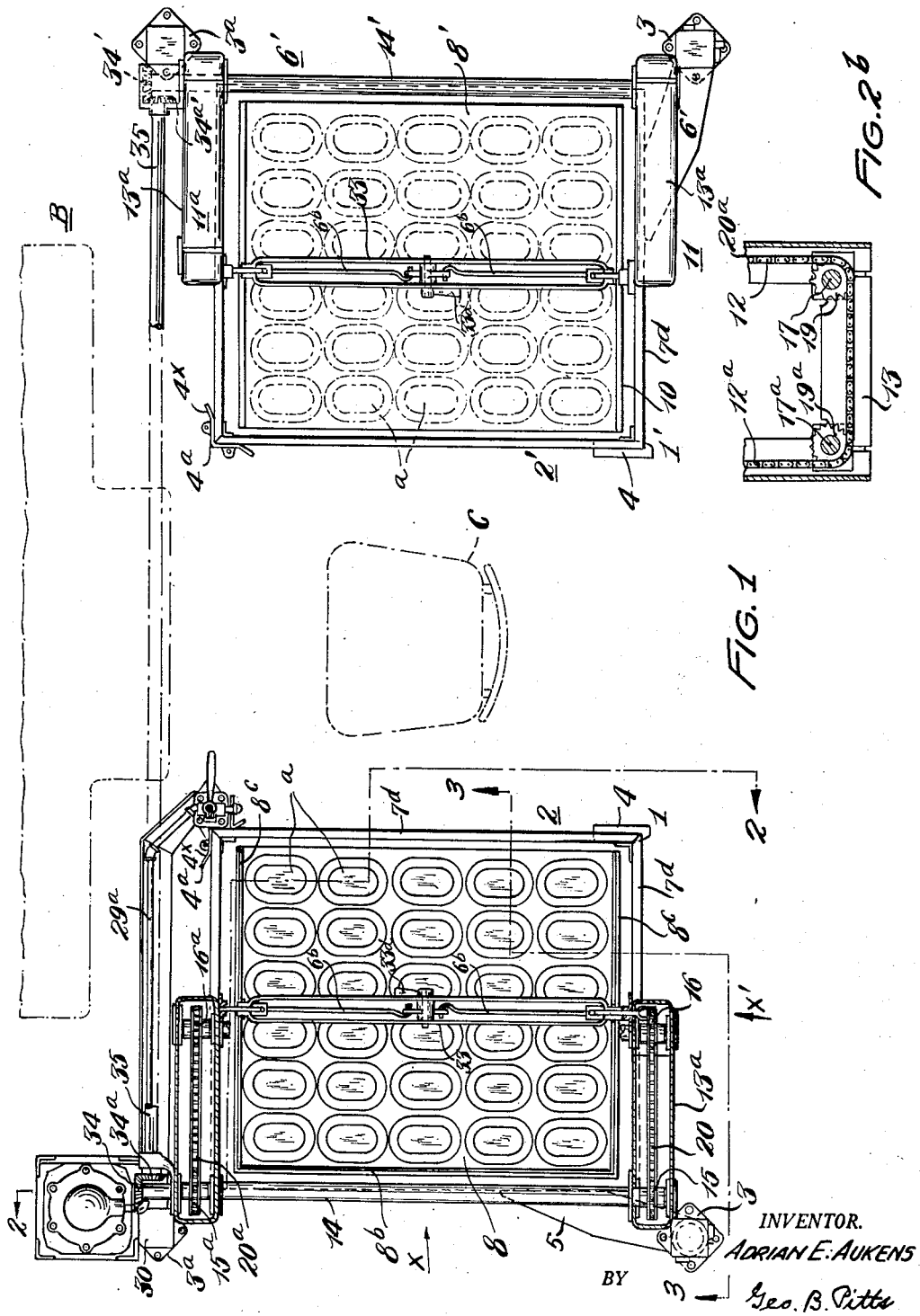
Fig. 1 is a plan view of an operating station showing the positioning mechanisms, a filled holder in one of the mechanisms and an empty holder in the other mechanism, parts being broken away.
Fig. 2 is a section substantially on the line 2—2 of Fig. 1, parts being broken away.
Fig. 2b is a fragmentary section on the line 2b—2b of Fig. 2.

In the drawings, referring to Figs. 1, 2, 3, 4 and 5, A indicates an operating or processing station in juxtaposition to a treating mechanism or apparatus B, and preferably having two positioning mechanisms 1, 1', for holders 2 of the articles to be treated, the holders being disposed in spaced relation to accommodate an operator between them in position to transfer articles from one positioned holder into engagement with the driven element of the mechanism B and from the latter to the other positioned holder. As later set forth, the articles a to be treated are supplied in superimposed groups (see Fig. 2) which are moved vertically to successively position them at a level within the normal reach of the operator when he is standing or occupying the chair C. As shown in Fig. 1, the holder 2 in the mechanism 1 is filled with articles a to be treated, whereas the holder 2 in the mechanism 1' is empty (the articles being shown in dotted lines) for a purpose later set forth. The positioning mechanisms 1, 1', are substantially similar in construction, so that the mechanism 1 will be described as follows (like parts in the mechanism 1' being identified by the same reference characters): 3, 3a indicate spaced uprights or standards suitably fixed to the flooring 3', the spacing of the uprights 3, 3a, providing an ingress and egress (see arrow x—Fig. 1) for each holder 2, as later set forth, for the positioning mechanism. For reasons later apparent, each holder 2, when delivered to the mechanism 1, is disposed in a predetermined position for detachable connection with a raising and lowering mechanism later referred to, for which reason I provide stops 4, 4a, suitably fixed to the flooring 3', and a swingable guide and stop 5. The stop 4 is spaced from and related to the upright 3 to provide a separate ingress and egress (see arrow x') for each holder 2, whereas stop 4a is provided with right angularly related walls 4x spaced from and related to the stop 4 and upright 3a. The swingable stop 5 is provided at its inner end with a hub 5a rotatably fitting a bearing provided on a shaft 5b mounted in the upright 3 (see Fig. 2a) above the floor 3' for swinging movement approximately 90 degrees to co-operate with the stops 4, 4a. As shown in Figs. 2 and 2a, the hub 5a is provided with a lug 5' which engages limiting devices 5'' on the upright 3 to limit the swinging movement of the stop 5 in each direction, as later set forth. When a holder 2 is moved through opening x' the stop 5 is positioned to engage the adjacent side wall of the holder 2 (see Fig. 1—at left) and co-operates with stop 4 to guide the holder 2 into engagement with the stop 4a and to hold the holder 2 against stop 4; when a holder 2 is moved through opening x the stop 5 is positioned to engage the adjacent end wall of the holder 2, to guide the latter into engagement with the stops 4, 4a (see Fig. 1—at right). The holder 2 is mounted on rollers 2a, those at one end of the holder being caster mounted, so that it may be manually guided for movement through either opening x, x'. Each holder 2 may be picked up by the elevating support of an elevating truck and conveyed from the filling station or article supply source to the operating station A and moved through either of the openings and discharged in the area between the stops and uprights and thereafter (if necessary) rolled into engagement with the stops and removed from the mechanism 1 in the same manner.

From the foregoing description it will be observed that when a holder 2 is moved through either opening x, x', and engaged with the positioning stops 4, 4a, 5, as shown in Fig. 1, it is operatively related to a raising and lowering mechanism indicated as an entirety at 6.

The raising and lowering mechanism 6 is arranged successively to position the groups of articles a at levels which provide ready accessibility thereto whether the operator is in a standing or sitting position, the articles a being delivered to each holder at a source of supply in layers, as shown in Figs. 1, 2, 3 and 4. The arrangement of the articles in each holder will depend on their size and shape, but in the form of construction being described I have shown articles the shape of which permits them to be arranged in rows and stacked one on another, whereby they are disposed in groups at different levels. The holder 2, in the form of construction being described, consists of a roller mounted polygonally shaped body 7 having a bottom wall 7a, side walls 7b and end walls 7c, the upper ends of which are reinforced by channel members 7d, and a container 8 for the articles a slidably fitting within the body 7, whereby it may be raised by the mechanism 6 and then permitted to gravitate downwardly after the articles a have been removed therefrom. The container 8 consists of a bottom wall 8a, a side wall 8b and end walls 8c, but it is open at that side (its inner side) related to the operator to permit access to the articles a by the latter at all levels to which the container 8 is raised. Guide devices are preferably provided between the walls 8c of the container and adjacent walls 7b of the body 7, the guide devices consisting of a laterally projecting lug 9 on the outer face of each end wall 8c, each lug 9 slidably fitting between a pair of elongated angles 9a fixed to the adjacent wall 7b of the body 7. The upper ends of the container walls 8b, 8c are reinforced by U-shaped members 10 and below the latter the walls 8c are formed with alined openings to removably receive the hooks on the ends of the links 6a, which provide detachable connections between the container 8 and the raising mechanism 6. 11, 11a, indicate a pair of frames disposed at opposite sides and outwardly of the opening x. Each frame consists of outer and inner upright members 12, 12a, alined with and preferably equal in length to the corresponding members, respectively, of the other frame, a connecting member 13 between the lower ends of the members 12, 12a, and a connecting member 13a between the upper ends thereof, preferably equal in lentgh to that of the connecting member 13. The opposed walls of the members 12, 12a, are open from end to end, as shown in Fig. 5, for a purpose later apparent. The lower end portions of the members 12, overlap the upper end portions of the uprights 3, as shown at 3x, and are rigidly secured thereto in any suitable manner (see Fig. 3). The opposite ends of the connecting members 13, 13a, overlap the adjacent ends of the members 12, 12a, respectively, for connection thereto. The frame members 12, 12a, 13, 13a, of each frame 11, 11a, are preferably hollow, so that their overlapping related side walls are formed with alined openings in which shafts (later referred to) are rotatably mounted, the latter in turn serving to pivotally connect the opopsite ends of each connecting member 13, 13a, and adjacent ends of the members 12, 12a, respectively, together. In this arrangement, each member 12a may swing relative to the adjacent member 12 while being maintained parallel to the latter, for purposes later to be set forth.

A shaft 14 pivotally connects the upper ends of the members 12 to the adjacent ends of the connecting members 13a and has keyed thereto sprockets 15, 15a, whereas a shaft 14a pivotally connects the upper ends of the members 12a to the adjacent ends of the connecting members 13a and supports sprockets 16, 16a, alined with the sprockets 15, 15a, respectively. Shafts 17, 17a, which connect the opposite ends of the connecting members 13 to the lower ends of the inner frame members 12, 12a, of each frame 11, 11a, respectively, are provided with sprockets 18, 18a, 19, 19a, respectively, the sprocket 19 being keyed to the adjacent shaft 17. From the foregoing description it will be observed that sprockets 15, 16, 18, 18a, are in alinement and engaged by an endless chain 20, whereas sprockets 15a, 16a 19, 19a, are in alinement and engaged by an endless chain 20a. As the shaft 17, to which the sprocket 19 is keyed, is driven in opposite directions as later set forth and the sprockets 15, 15a, are keyed to the shaft 14, it will be noted that upon driving the shaft 17 in either direction the chains 20, 20a, will be operated in a corresponding direction. The shaft 17 is connected through a coupling 21 (Fig. 2) to a shaft 21a suitably mounted in bearings supported in spaced angles 22 forming part of a housing 23. The housing 23 consists of vertically disposed angles connected at their lower ends to a channel member 23a, the inner side of which and the adjacent angle 22, are supported on the upright 3a, the sides of the housing 23 preferably consisting of sheets of screen material. The channel 23a is formed with an opening in which a screw 24 is mounted for a purpose later set forth. The screw 24 is threaded through a plate 24a the opposite ends of which are connected to spaced collars 24b, the latter being provided with suitable bearings for a shaft 24c disposed parallel to the shaft 21a. The shaft 24c outwardly of the collars 24b is provided with sprockets 25, 25a, alined with sprockets 26, 26a, respectively, keyed to the shaft 21a. As shown, the sprockets 25, 26 are engaged by an endless chain 25' and the sprockets 25a, 26a, are engaged by an endless chain 26'. In the arrangement described, the screw 24 is also utilized to take up slack in the chains 25', 26'. The shaft 21a is driven in either direction to rotate the shaft 17 by driving the chains 25', 26'. The driving of the chains 25', 26', is effected by a cylinder-piston unit, the opposite ends of the cylinder 27 being connected to a supply of fluid under pressure, such as oil. The cylinder 27 is disposed endwise of the housing 23, the lower head 27a of the cylinder being bolted to the angles 22. The piston 28 is connected to the upper end of a rod 28a which extends through the head 27a and is provided at its lower end with a cross head 28b the outer ends of which are connected to the outer runs of the chains 25', 26'. As shown in Fig. 2, one fluid supply pipe 29 is connected through the head 27a to the lower end of the cylinder 27 and the other fluid supply pipe 29a is connected through the upper cylinder head with the upper end of the cylinder 27. The pipes 29, 29a, are extended through a housing 30 and connected to a suitable valve 31 supported on a pedestal 31a, within the reach of the operator. The valve 31 is connected with a pipe 32 leading from a source of fluid pressure supply. When the handle 31' of the valve 31 is in neutral position, the fluid pressure is cut off. In one operated position of the handle 31' fluid pressure is supplied to pipe 29, whereas in its other operated position fluid pressure is supplied to the pipe 29a; accordingly, the operator can control the movement of the piston in either direction to move the cross head 28b and drive the chains 25', 26', so that the latter through the sprockets 19, 15a, shaft 14 and sprocket 15 operate the chains 20, 20a, in the desired direction.

As shown in Fig. 2, I provide a cross member 33 the opposite ends of which are suitably connected to the inner runs of the chains 20, 20a (see Fig. 3), between the sprockets 16, 18, and 16a, 19, respectively, and pivotally support the links 6a. The cross member 33 preferably consists of a pair of metal strips in side-by-side spaced relation and supporting the opposite ends of pivot pins 33a, on which the links 6a swing, the opposite end portions of the strips overlap the opposite sides of and are removably secured to the inner chain runs in any desired manner, as shown in Fig. 3. The links 6a are pivoted to the outer ends of rods 6b, the inner ends of which are pivotally connected to the opposite ends of a rocker 6c trunnioned on the cross member 33 intermediate its ends, the trunnion 6d being provided with a handle 33a' adapted to simultaneously swing the links 6a and project the hooked ends thereof through the openings in the walls 8c of the container 8 when the cross member 33 is in its down position, to connect the raising mechanism 6 to the container 8.

Operation: When a holder 2 is to be supplied with articles a, the container 8 is in its lowered position supported on the bottom 7a of the body 7, as shown in dotted lines in Fig. 2. The operation of filling the container 8 is facilitated since its inner side is open from the bottom 7a to the reinforcing member 10 (see Fig. 3). As shown, the articles a of each group are arranged in rows and are stacked on each other. When the filled holder is transported to and positioned against the stops 4, 4a, 5, the articles forming the uppermost layer a' thereof are in an accessible position, whereby the operator or attendant may transfer each article a to the machine B for treatment, following which the article may be dropped into a receiver (not shown). When all of the articles a forming the layer a' have been removed, the operator, by means of the handle 31', operates the raising mechanism 6 to move the container 8 upwardly. In carrying out the raising operation, the operator, at his discretion, may raise the container 8 to position the next lower layer or group of articles at the level occupied by the first layer or group or two or more layers or groups may be raised to an accessible position.

Where the mechanism 1' is employed at the operating station A, as shown in Fig. 1, such mechanism constitutes a receiver. As shown, a holder 2' is positioned against the adjacent stops 4, 4a, 5. Also, the container raising mechanism 6' is geared to the raising mechanism 6 of mechanism 1, so that when the container 8 in the latter mechanism is in its lowest position, seated on the bottom 7a of the body 7, the container 8' in the mechanism 1' is in its highest position. In this arrangement, in moving the container 8 in mechanism 1 upwardly a predetermined distance, the container 8' in the mechanism 1' is moved downwardly an equal distance; likewise, in moving the container 8 downwardly the container 8' is moved upward a corresponding distance. The driving connections between the container raising mechanisms consists in extending the shaft 14 of the mechanism 1 and providing on its end portion a bevel gear 34. The gear 34 is in mesh with a bevel gear 34a keyed to the adjacent end of a shaft 35. The remote end of the shaft 35 is provided with a bevel gear 34a' which is in mesh with a bevel gear 34', the latter in turn being mounted on and keyed to the extended end of the shaft 14' of the mechanism 1'. As the shaft 14 of the raising mechanism 6 of mechanism 1 is driven through the chain 20a by the fluid pressure means, as already set forth, shaft 14' of the raising mechanism 6' of the mechanism 1' drives the latter mechanism 6'. Accordingly, as the operator successively removes articles a of each group in the container 8 following treatment thereof, the articles are successively positioned in container 8', the top group in container 8 being positioned on the bottom of the container 8'. When the container 8 is emptied, the container 8' is filled with an equal number of articles a. A holder 2 filled with articles a replaces the empty holder 2 and an empty holder 2' replaces the filled holder 2'. As the raising mechanisms 6, 6', are drivingly connected, as above set forth, operation of the valve 31 effects movement of both mechanisms.

By reference to Fig. 2, it will be observed that when a holder is to be positioned in the mechanism 1, the container 8, as shown in dotted lines, rests on the bottom wall 7a of the body 7, so that the openings in the container walls 8c for receiving the hooked ends of the links 6a are below the channel members 7d of the body 7. With the cross member 33 in its lowered position, the hooked end portions of the links 6a would be in the path of movement of the channel member 7d on the body 7 when the latter is being positioned in the mechanism 1 or removed therefrom. To eliminate the condition just referred to, provision is made to automatically raise the cross head 33 to permit each holder to be positioned in the mechanism 1 and to be removed therefrom as follows: 36 indicates an arm fixed to each of the inner upright members 12a of the frames 11, 11a, and extending rearwardly therefrom, the outer end portions of the arms 36 being disposed in the paths of movement of trips 37 fixed to the outer runs 20' of the chains 20, 20a, so that when the runs 20' are moving upwardly the trips thereon engage the arms 36 and move the upright members 12a upwardly (see dotted lines in Fig. 3) and the sprockets 16—18a, 16a—19a, which are engaged by the chains 20, 20a, will raise the inner chain runs to raise the cross head 33, whereby the links 6a are operated to an inoperative position to clear the channel member 7d during positioning or removal of each holder. When the container 8 is resting on the bottom 7a of the body 7, the upright members 12a, arms 36 and trips 37 are in the position shown in dotted lines in Fig. 3, and the cross head 33 is in the position shown in dotted lines in Fig. 2. The holder 2 is then moved into the mechanism 1 in engagement with the stops 4, 4a, 5, whereby the openings in the walls 8c of the container 8 are in position to receive the hooked ends of the links 6a; next, the handle 33a' is operated to swing the links 6a and project their hooked ends in the openings formed in the container walls 8c; next the chains 20, 20a, are driven to move the outer runs 20' downwardly and the inner runs upwardly, the trips 37 being thereby disengaged from the arms 36 and moved downward with each successive operation to raise the container 8 as already set forth, the initial downward movement of the chain runs 20' serving to permit the upright members 12a to gravitate to normal position, as shown in full lines in Fig. 3. When the container 8 has been moved to its uppermost position and the layer of articles on the bottom wall 8a thereof have been removed, the piston 28 is moved in the opposite direction which serves to drive the inner chain runs downwardly and outer runs 20' upwardly, so that as the container 8 engages the bottom wall 7a the trips 37 engage the arms 36 to raise the upright members 12a. It will be understood that the cross head is so fixed to the inner runs of the chains 20 as to move a slight distance relative to the container 8 following the engagement of the latter with the bottom wall 7a and prior to the engagement of the trips 37 with the arms 36, which relative movement permits the hooked ends of the links 6a to be removed from the openings in the walls 7c and be swung to an inoperative position prior to the raising of the upright members 12a. In the operation of engaging the links with the container walls and raising the latter the initial movement of the inner chain runs upwardly and outer runs 20' downwardly permit the trips 37 to disengage the arms 36 and permit the upright members 12a to swing downwardly to normal position. The openings in the container walls 8c for the links 6a are elongated vertically to facilitate the insertion of the hooked ends of the links therein and their removal therefrom.

Fig. 6 illustrates a holder 2" consisting of a roller mounted body 2" and a modified form of container, indicated as an entirety at 8", mounted for vertical movement in the body 2" by a raising mechanism 6x preferably similar to that shown in Figs. 1, 2, 3 and 4. The body 2" is preferably similar to the body 7 shown in Figs. 1, 2, 3 and 4. The container 8" consists of a bottom wall 41, a side wall 41a and end walls 41b. The bottom wall 41 at that side of the container adjacent the operator is provided with an upwardly extending flange 41c, the adjacent side of the container above the flange 41c being open to permit access to the groups of articles a as the container 8" moves upwardly. In this form of construction, the lowermost group of articles a is mounted on the container bottom wall 41 and the upper groups of articles are mounted on displaceable supports 42, spacedly related one above the other. Each support 42 consists of a base 42a on which the articles are positioned and a vertical wall 42b preferably integrally connected with and depending from the outer end of the base. Each wall 42b is co-extensive in length to the width of the adjacent base 42a and has a height equal to the spacing of the bases 42a, so that when the supports 42 are in normal position, as shown in Fig. 6, the walls 42b engage the adjacent lower bases 42a, respectively (the lowermost base engaging the bottom wall 41), to close the areas between them and in effect form a false side wall for the container 8". The walls 42b co-operate with shafts 43, to which the inner ends of the bases are connected to support the supports 42 in horizontal position. As shown, each support 42 is mounted on alined shafts 43 at its inner end and adjacent the opposite end portions thereof. The shafts 43 extend laterally and are suitably mounted in the container end walls 41b. As will be observed, following the removal of the articles a from each support it may be displaced into an inoperative position, that is, swung upwardly, as shown in dotted lines, so that the articles on the adjacent lower support 42 are uncovered and by operation of the raising mechanism moved into the accessible position. By preference, means are provided for yieldably holding each support 42 in normal or horizontal position or in its displaced position. These holding means for each support consist of the following: 45 indicates a longitudinally, inwardly extending slot formed in the adjacent base 42a. 45a indicates a coiled spring in alined relation to the slot 45 and anchored at its inner end to the side wall 41a below the adjacent base 42a. The outer end of the spring 45a is connected to the bottom of the adjacent base outwardly of the end wall of the slot 45, the spring 45a being under tension, and disposed on the lower side of the axis on which the support 42 swings, serves to bias the latter in a clockwise direction, as viewed in Fig. 6; however, following the removal of the articles a from the support, slight upward pressure by the operator thereon, in opposition to the tension of the spring 45a, will swing the support upwardly and thus bodily move the spring to the opposite side of said axis, the tension of the spring thereby serving to swing it to and hold the support in its displaced position as shown in Fig. 6. It will therefore be observed that each support may be yieldably held in either normal or displaced position.

Fig. 7 illustrates a holder having a modified form of container 8x in which articles a may be positioned as shown in Figs. 2 and 3, or provided with displaceable supports, as shown in Fig. 6. The container 8x is movable vertically to successive levels by a raising mechanism, as already described. The container 8x consists of a bottom wall 46, a side wall 46a and end walls 46b and a flexible closure 46x for that side of the container adjacent the operator. The closure 46x consists of side-by-side, hingedly connected members 46a' each provided at its opposite ends with laterally extending pins 46x' mounted in alined slots 47 formed in marginal edge portion of the end walls 46b, the slots 47 being uniformly spaced corresponding to the spacing of the pins 46x', substantially from the bottom wall to the upper end of the end walls 46b, so that when the container 8x is in its lower or normal position, the flexible member 46x closes the container 8x, the pins 46x' being held in the slots 47 by their engagement with guides 46b' fixed to the adjacent side wall of body 2". To provide for access to the articles a in the container at the accessible level or position, deflectors 48 are mounted on the reinforcement member 48a disposed at the upper end of the body 2". As shown, the deflectors 48 are of substantially U-shape in cross section and inverted, their inner ends being disposed in the path of movement of the pins 46x', so that as the container 8x is moved upwardly the pins 46x' engage the deflectors 48 which direct the flexible closure 46x laterally and downwardly. In the downward movement of the container 8x, the engagement of the pins for the members 46a' at the inner end of the closure being seated in the adjacent slots serve to insure movement of the closure 46x in the reverse direction to close the container. As shown, the opposed walls of each slot 47 are curved downwardly, the lower wall being disposed on a radius equal to the spacing of the inner ends of the adjacent slots. This form of slot facilitates the movement of the pins 46x' outwardly in the upward movement of the container 8x and insures a meshing relation of the pins with the slot walls in the downward movement of the container.

Figure 16:
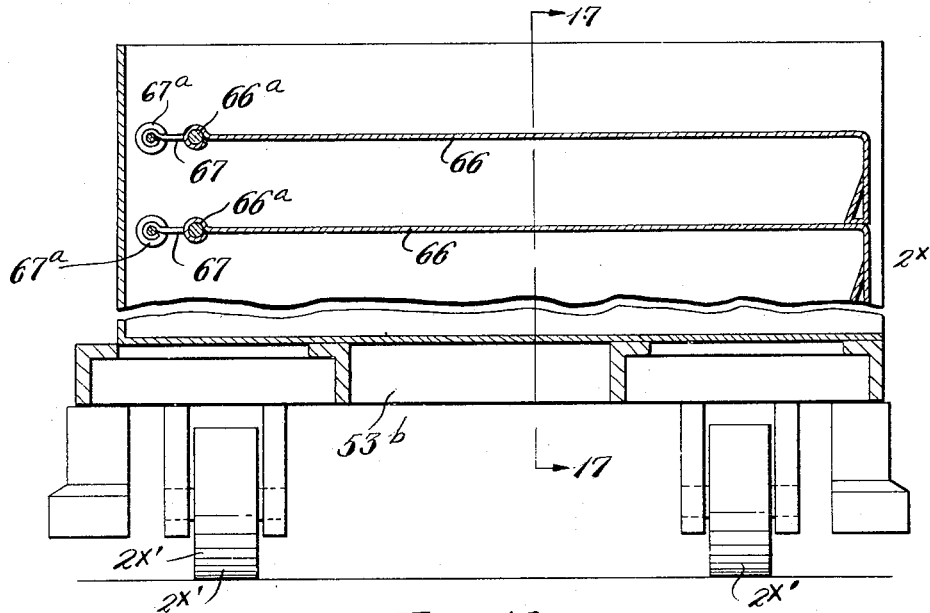
Fig. 16 is a fragmentary section on the line 16—16 of Figs. 9, 15 and 17.
Figure 17:
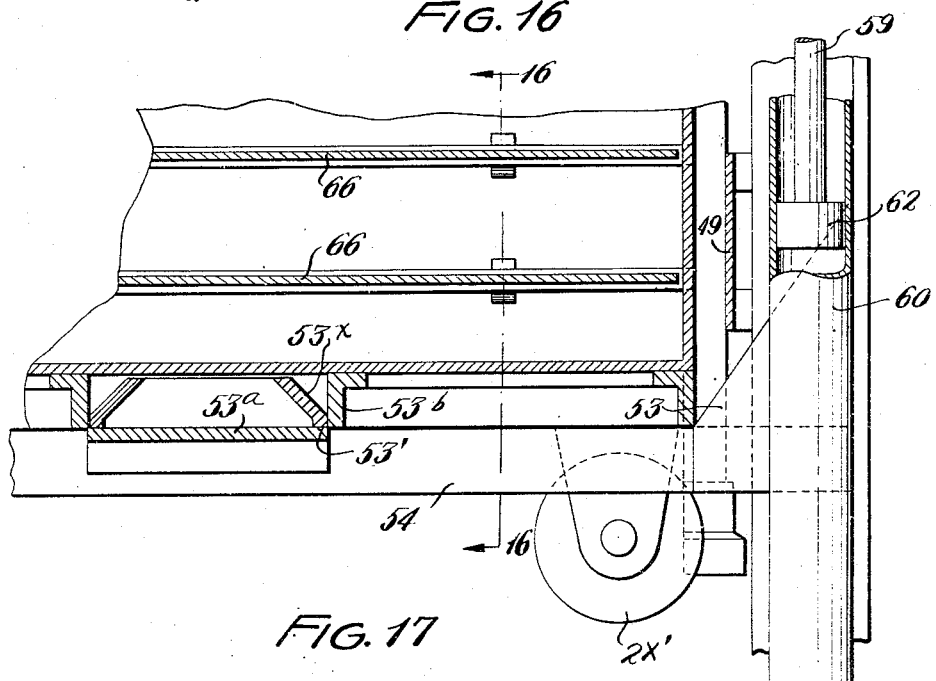
Fig. 17 is a fragmentary section substantially on the line 17—17 of Fig. 16.

Referring to Figs. 9 to 18, inclusive, which illustrate a modified form of positioning mechanism and a modified form of holder adapted to be positioned therein, A' indicates the operator's station showing the operator sitting on a chair C' and reaching for an article a, a portion of the treating mechanism being shown in dotted lines at B'. The positioning mechanism, indicated as an entirety at 1x (Fig. 10), consists of the following: 49 indicates a base suitably fixed to the floor 3' by angles 49a (one being shown in Figs. 9, 10, 12 and 13). 49b, 49b', indicate front and rear uprights, the rear upright 49b' being suitably mounted on the base 49. The upper end of the upright 49b' is braced by a laterally extending cross member 49c, which is connected to spaced channel members 50, 50a, the latter being fixed at their lower ends to the base 49 and providing guides for a carriage forming a part of a raising mechanism indicated as an entirety at 6x'. The upper ends of the guides 50, 50a, are connected together by a cross member 50b. The upper end of the guide 50 is provided with a forwardly extending bracket 50c (for a purpose later set forth), the outer end of which is braced by a stay 51 connected to the upper end of the upright 49b. 52 indicates an abutment for the holder 2x arranged to limit the inward movement thereof so that the holder may be engaged and raised by the mechanism 6x'. I preferably provide two abutments 52, disposed in spaced relation in the same vertical plane transversely of the guides 50, 50a, the opposite end portions of the abutments 52 being connected by brackets 52a to the guides 50, 50a. 50x indicates guides on corresponding ends of the abutments 52 to direct the holders, when moved toward the right (as viewed in Fig. 10), into operating position. 53 indicates as an entirety interconnecting means between the raising mechanism 6x' and each holder 2x and consisting of two members, namely, a male member 53a between and suitably fixed to forks 54 (later referred to) and a female member 53b fixed to the bottom wall of each holder 2x (see Figs. 11, 16 and 17). The members 53a, 53b, are adapted to be in alined relation when a holder 2x is in engagement with the lower abutment 52, so that upon raising of the forks 54, the members 53a, 53b, register and inter-engage one with the other and fixedly relate the holder 2x to the raising mechanism 6x'. In this arrangement, each holder 2x supplied to the positioning mechanism has a predetermined relation to the raising mechanism 6x' and when the holder is raised to successive accessible levels or positions, the group of articles at each level is in the same relation to the operator. As shown in Fig. 16, the member 53b consists of right angularly related walls depending from the bottom wall of the holder 2x. The member 53a is provided with side walls 53' complementary to the walls of the member 53b and fit into the latter as shown in Fig. 17. The walls 53' are provided with upwardly and inwardly extending guides 53x, so that in the initial upward movement of the forks 54, the walls of the member 53b are guided into registering relation with the walls 53' of the member 53a.

Figures 12, 14:
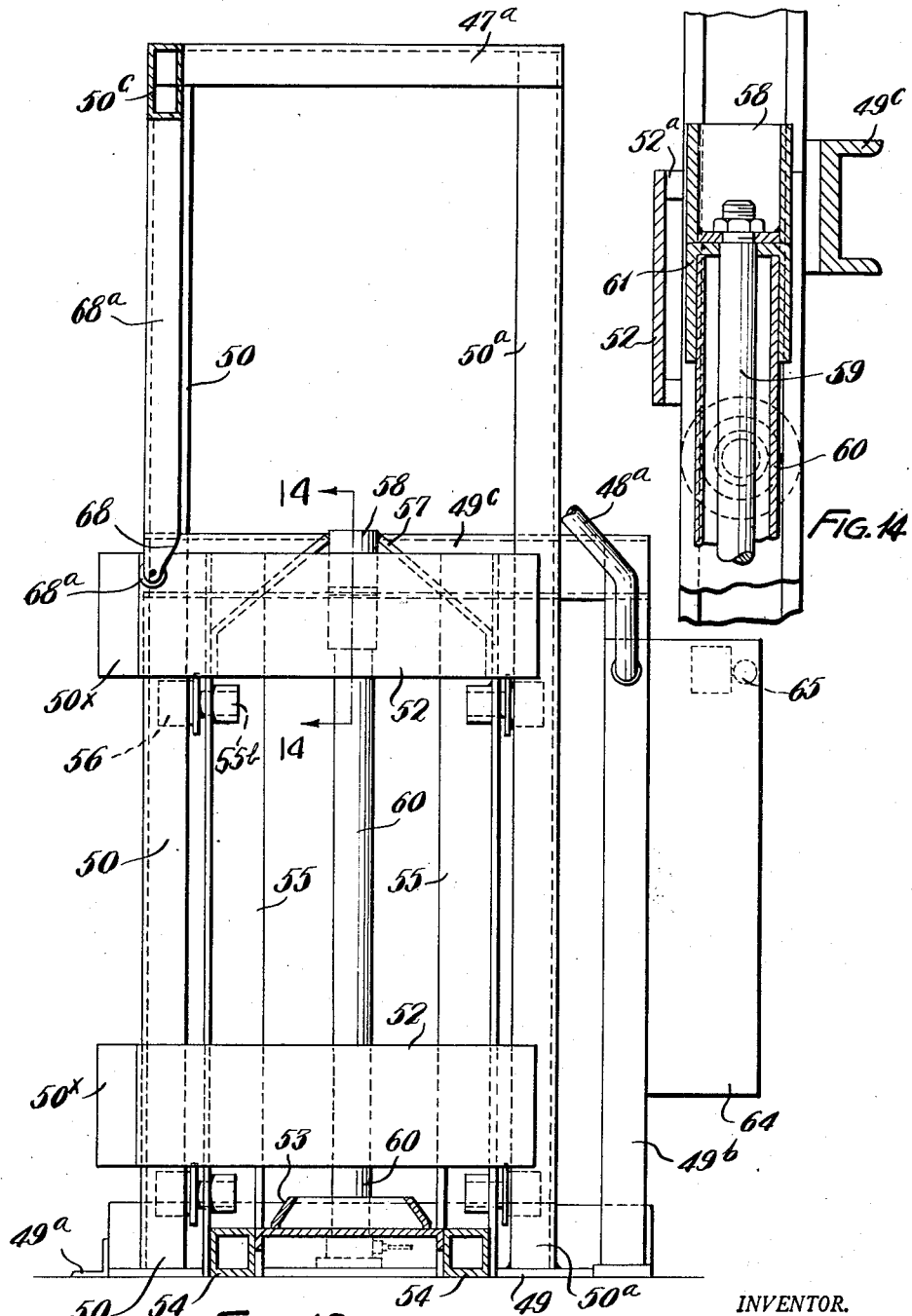
Fig. 12 is a section on the line 12—12 of Fig. 11.
Fig. 14 is a fragmentary section on the line 14—14 of Fig. 12.

The raising mechanism 6x' comprise the following: 55 indicates a pair of spaced angles to which the inner ends of the forks 54 are connected by pairs of gussets 54a. The lateral side wall of each angle 55 is provided with upper and lower inwardly extending housings 55a each having therein suitable bearings for the inner end portion of a shaft 55b. Each shaft extends through an opening formed in the side wall of the adjacent angle 55 and supports on its outer end portion a flanged roller 56 adapted to engage and roll on the walls of the adjacent guide. The upper ends of the lateral side walls of the angles 55 are connected by bars 57 to the upper end of a cup-shaped member 58, the bottom wall of which is suitably fixed to the upper end of a piston rod 59. From the foregoing description it will be observed that the forks 54, angles 55, bars 57 and cup-shaped member 58 form a carriage for each holder 2x slidably mounted on the guides 50, 50a, for movement vertically on the latter. 60 indicates a cylinder mounted at its lower end on the base 49. The upper end of the cylinder 60 is closed by a cap 61, the bottom wall of which is formed with an opening through which the piston rod 59 extends. The lower end of the piston rod 59 is connected to a piston 62 (see Fig. 17). The lower end of the cylinder 60 is formed with an inlet to which is connected a hose or pipe 63 leading from a suitable valve in a casing 64, the valve in turn being suitably connected with a source of fluid under pressure supply (preferably oil). The valve is controlled by a handle 65 mounted on the end wall of the casing 64 (Fig. 12). In one position of the handle 65 fluid under pressure is supplied to the lower end of the cylinder 60 for application to the piston 62 to raise the holder 2x to locate the uppermost and each adjacent lower group of articles at the accessible level or position; by moving the handle 65 to neutral position the holder 2x is maintained at the selected level. When the articles a of all of the groups have been removed, operation of the handle 65 to its other position permits the oil in the cylinder to escape through an outlet in the valve to a sump (not shown), whereby the carriage is free to gravitate to engage the rollers 2x' of the holder with the floor 3'.

Each holder 2x consists of a bottom wall and side and end walls, the bottom wall being supported on the rollers 2x', the rollers at one end of the bottom wall being caster-mounted, and superimposed spaced supports 66 for groups of articles a.

Figure 9:
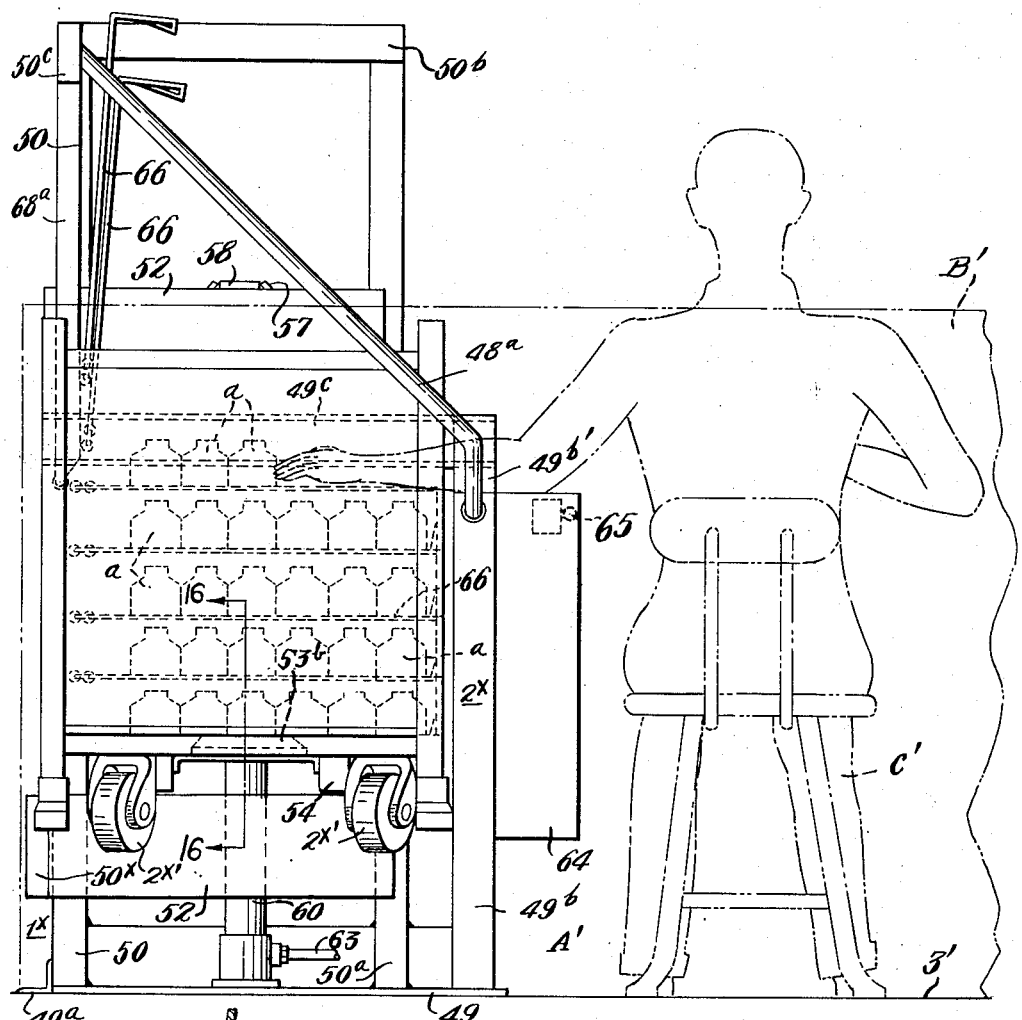
Figure 18:
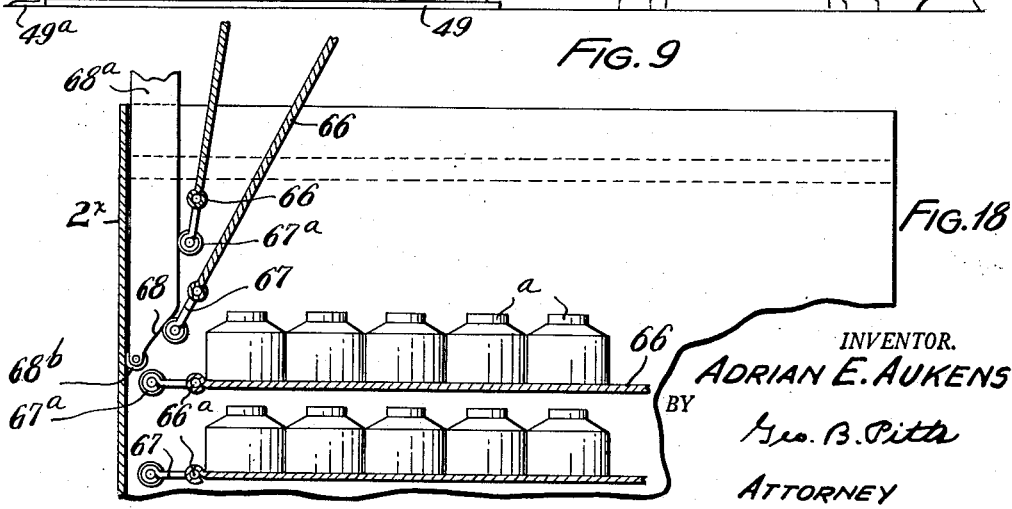
Fig. 18 is a fragmentary section of parts shown in Fig. 9, enlarged.
Figure 10:
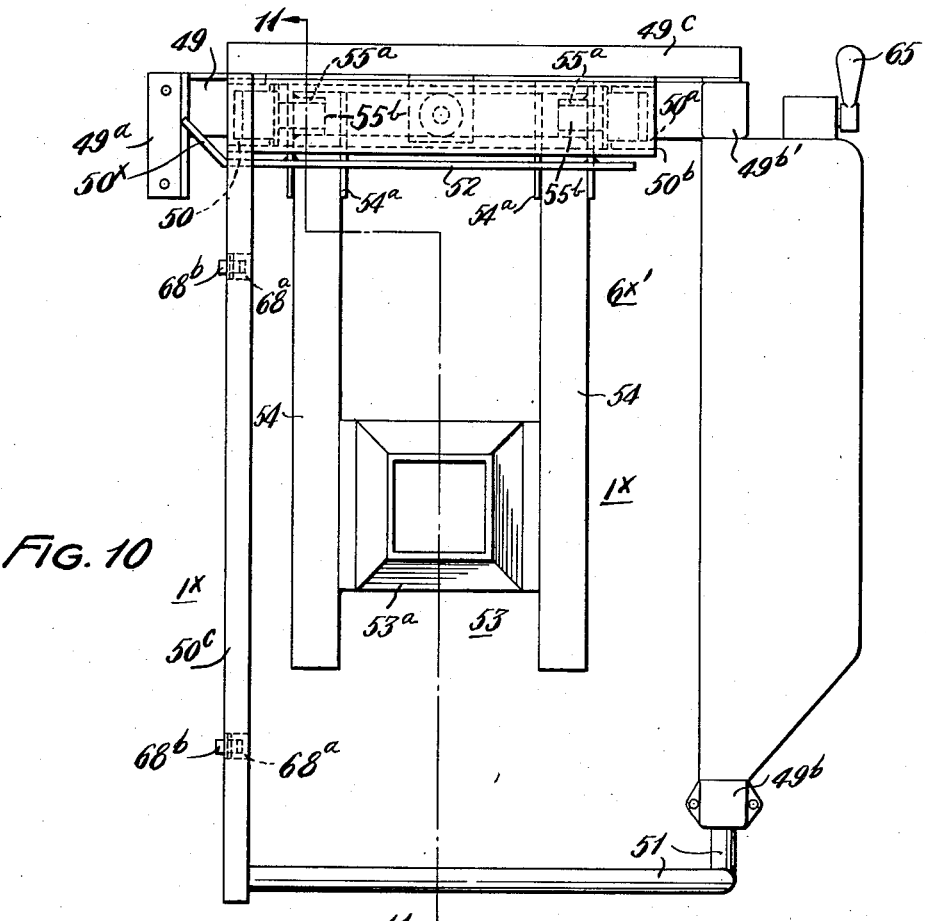
Fig. 10 is a plan view.
Figure 15:
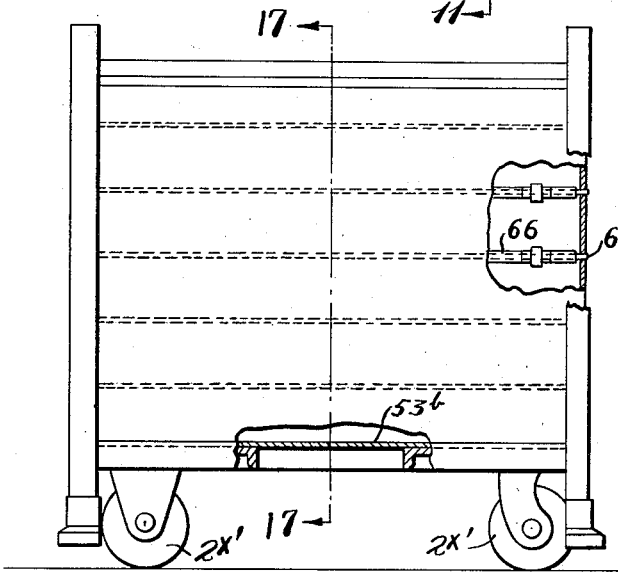
Fig. 15 is a side elevation of a modified form of holder, parts being broken away.
Figures 11, 13:
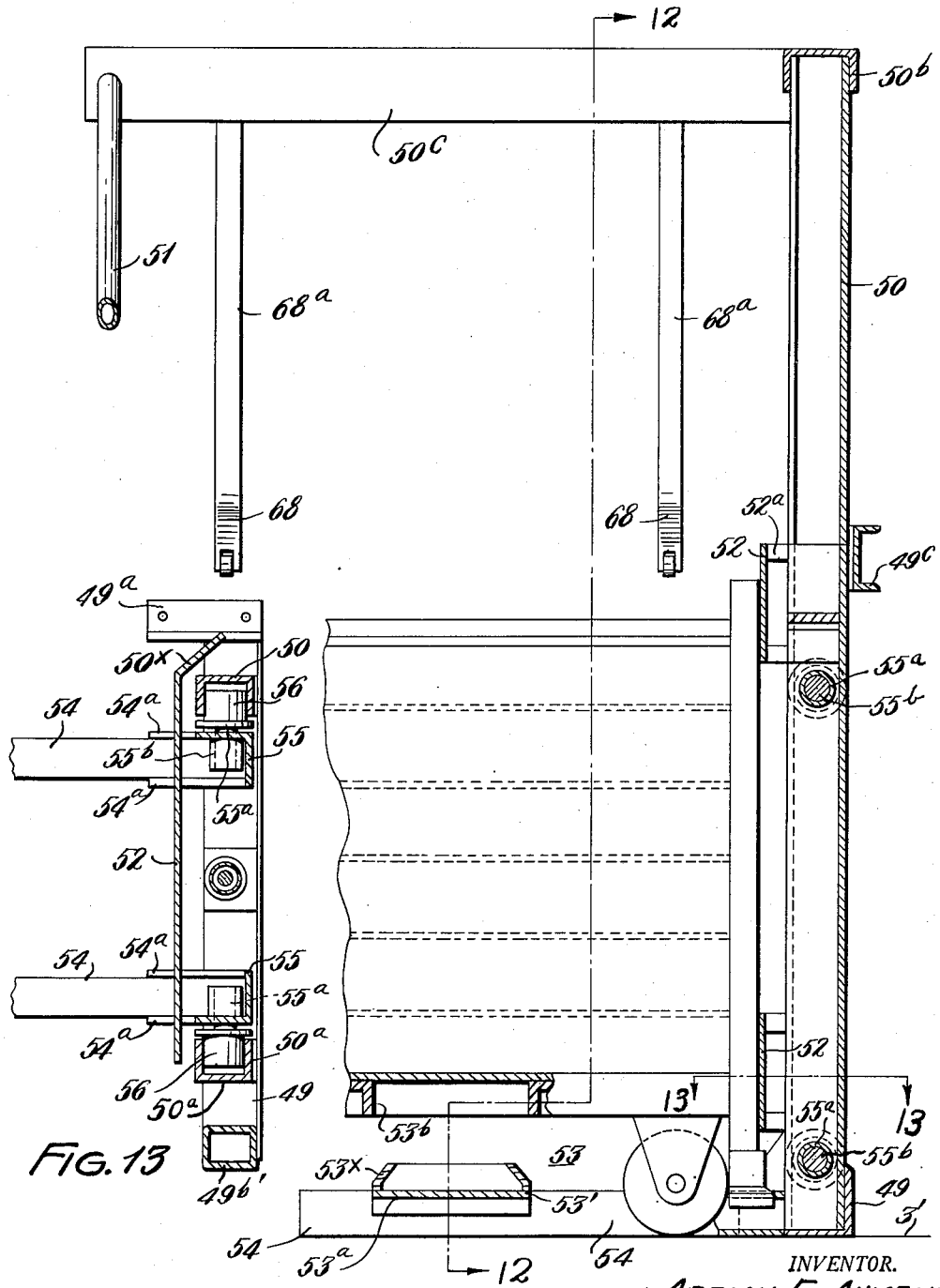
Fig. 11 is a section on the line 11—11 of Fig. 10.
Fig. 13 is a section on the line 13—13 of Fig. 11.

The supports 66 are substantially similar in construction to the supports 42, except that in the raising of the holder 2x to successive levels, the support at each previous level is automatically displaced, that is, swung upwardly (see Figs. 9 and 18). The displacement of the supports 66 is effected by the following: each support 66 is mounted on a shaft 66a, the opposite ends of which are suitably mounted in the adjacent end walls of the holder 2x and provided with rearward arms 67 each in alined relation to a cam 68. The cams 68 are provided on the lower end of supports 68a fixed to and depending from the bracket 50c (see Fig. 11). By preference, each arm 67 is provided at its outer end with a roller 67a to reduce friction between the arm and the adjacent cam 68 and the lower end of the latter is provided with a roller 68b which rides the adjacent wall of the holder 2x as the latter moves upwardly.

The method of processing the articles a is carried out in the following manner: first, a batch of the articles is placed in a holder. Where the holder is of the type shown in Figs. 1, 2, 3 and 4, the articles are placed in a container, which is vertically movable relative to the holder, whereas in Figs. 9 to 18, inclusive, the articles are placed in the holder 2x. The articles, for purposes of illustration, are of a shape which permits them to be grouped in superimposed layers; that is, stacked on each other or positioned on spaced supports, as shown. The filled holder is then moved or transported to a positioning mechanism, so that the holder may be predeterminately related to the engaging elements of a raising mechanism. The filled holder is then raised, so that the layers of articles are progressively positioned at a level wherein each layer is related to that portion of the operator's body that is accessible to the hand on the adjacent arm of the operator. Next, the operator grasps each article and subjects it to one or more treatments by the mechanism B'; following such processing the processed article is placed or deposited in a receiver. Where two holders are provided, as shown in Fig. 1, one holder is filled with the articles to be processed and in its lower position so as to be progressively raised and the other holder is empty and in a raised position and progressively lowered so that the operator is able to place the processed article in the latter holder, whereby the articles in the filled holder are successively removed and following the processing step successively positioned in the other holder, which facilitates later handling of the articles, as well as keeping various accounting and production records.

To those skilled in the art to which my invention relates, many changes in construction and widely differing embodiments and applications of the invention will be apparent without departing from its spirit and scope. My disclosures and the illustrations herein are purely illustrative and are not intended to be in any sense limiting.

What I claim is:

1. A mechanism for holding a supply of articles to be processed comprising supporting means, vertically disposed guides thereon, a holder for the articles to be processed comprising a body open at its upper end and having a bottom wall, a rear side wall and end walls and open at its front side, a plurality of superimposed spaced supports each adapted to support a plurality of articles, and fluid operated means removably engaging said holder for raising it relative to said guides to successively position said supports at a predetermined level, and hinged connections between the rear end of each support and an adjacent wall of said holder, whereby each support following the removal of the articles therefrom may be swung into a displaced position.

2. A mechanism as claimed in claim 1 wherein means are provided for maintaining each support in its displaced position.

3. A mechanism as claimed in claim 1 wherein an arm is provided on each support and a cam, fixedly related to said supporting means is disposed in the path of movement of the outer ends of said arms for swinging each support into a displaced position as said holder is moved upwardly.

4. A mechanism as claimed in claim 1 wherein each support is provided at its front end with a depending wall arranged to engage the adjacent lower support to close the space between said supports.

5. A mechanism as claimed in claim 1 wherein the bottom of said holder and said raising means are provided with alined devices arranged to inter-engage in the initial upward movement of the latter to removably and fixedly connect the holder to said raising means.

6. A mechanism as claimed in claim 5 wherein said raising means consist of a carriage having pairs of rollers engaging said guides and a pair of outwardly extending forks on which said holder is removably supported and supports the adjacent alined device.

References Cited in the file of this patent
UNITED STATES PATENTS

| Number | Name | Date |
|---|---|---|
| 1,431,702 | Smend et al. | Oct. 10, 1922 |
| 1,434,587 | Broadley | Nov. 7, 1922 |
| 1,440,204 | Alschuler | Dec. 26, 1922 |
| 1,559,199 | Straight | Oct. 27, 1925 |
| 2,065,673 | Fay | Dec. 29, 1936 |
| 2,506,661 | Busse | May 9, 1950 |